(12) United States Patent
Makhija et al.

(10) Patent No.: US 7,831,661 B2
(45) Date of Patent: Nov. 9, 2010

(54) MEASURING CLIENT INTERACTIVE PERFORMANCE USING A DISPLAY CHANNEL

(75) Inventors: Vikram M. Makhija, Castro Valley, CA (US); Rishi N. Bidarkar, San Jose, CA (US); Sunil Satnur, Palo Alto, CA (US); Srinivas Krishnan, Carrboro, NC (US)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 12/337,774

(22) Filed: Dec. 18, 2008

(65) Prior Publication Data

US 2010/0161711 A1   Jun. 24, 2010

(51) Int. Cl.
*G06F 15/10* (2006.01)
(52) U.S. Cl. .................... 709/203; 709/202; 709/204; 709/206; 709/224; 370/252; 370/249; 370/241; 370/231; 370/242; 705/8
(58) Field of Classification Search ......... 709/202–206, 709/224
See application file for complete search history.

(56) References Cited

U.S. PATENT DOCUMENTS

2005/0187950 A1\* 8/2005 Parker et al. ................. 707/100
2009/0100164 A1\* 4/2009 Skvortsov et al. ........... 709/223

\* cited by examiner

*Primary Examiner*—Jude J Jean Gilles (57) ABSTRACT

Methods, systems, and computer programs for measuring performance of virtual desktop services offered by a server computer are presented. The method includes receiving from a client computer an action request to be executed at the server computer, where the server computer is configured to generate display views for the requesting client. The method further embeds, at the server computer, a first encoded pixel into a first image frame that is communicated to the client computer when acknowledging receipt of the action request. Further, the method embeds a second encoded pixel into a second image frame that is communicated to the client computer after completion of the action associated with the action request. Action performance time is stored in memory, where the action performance time is the time between arrivals of the first and second image frames at the client computer. The stored timing information is used to generate statistical performance data.

21 Claims, 10 Drawing Sheets

MEASURING CLIENT INTERACTIVE PERFORMANCE USING A DISPLAY CHANNEL

CROSS REFERENCE TO RELATED APPLICATIONS

This application is related to U.S. patent application Ser. No. 12/337,895, filed on the same day as this application, and entitled "MEASURING REMOTE VIDEO PLAYBACK PERFORMANCE WITH EMBEDDED ENCODED PIXELS," which is incorporated herein by reference.

BACKGROUND

The computing industry has seen many advances in recent years, and such advances have produced a multitude of products and services. Computing systems have also seen many changes, including their virtualization. Virtualization of computer resources generally connotes the abstraction of computer hardware, which essentially separates operating systems and applications from direct correlation to specific hardware. Hardware is therefore abstracted to enable multiple operating systems and applications to access parts of the hardware, defining a seamless virtual machine. The result of virtualization is that hardware is more efficiently utilized and leveraged.

In a typical virtualized desktop infrastructure architecture, user displays and input devices are local, but applications execute remotely in a server. Because applications are executing remotely, a latency element is introduced due to network travel time and application response time. One method of assessing the performance of remote applications is by measuring the response times for various events. These response times are the result of aggregating latency across different components in the architecture. Measuring these latencies, however, is a challenge as measurements must encompass latencies related to both the low level events (such as mouse movements) and the high level events (application launches), as well as work across network boundaries and a range of client devices. While recording the start of an event on the client side is straightforward, recording the end of the event accurately is challenging due to the lack of semantic information, such as for example, knowing when an application has launched or detecting when a character has appeared on the screen.

It is in this context that embodiments of the invention arise.

SUMMARY

Embodiments of the present invention provide methods, systems, and computer programs for measuring performance of virtual desktop services offered by a server computer. Timing information is communicated via embedded pixels in the display channel enabling performance analysis independent of the underlying communication protocols.

It should be appreciated that the present invention can be implemented in numerous ways, such as a process, an apparatus, a system, a computer program, a device or a method on a computer readable medium. Several inventive embodiments of the present invention are described below.

In one embodiment, a method for measuring performance of virtual desktop services offered by a server computer is presented. The method includes receiving from a client computer an action request to be executed at the server computer. At the server computer, a first encoded pixel is embedded into a first image frame that is communicated to the client computer when acknowledging receipt of the action request. The method further embeds at the server computer a second encoded pixel into a second image frame that is communicated to the client computer after completion of an action associated with the action request. An action performance time is stored in memory after calculating the time elapsed between arrivals of the second and first image frames at the client computer.

In another embodiment, a method measures performance of a virtual desktop application at a client computer. The method includes sending from the client computer an action request to be executed at a server computer, and polling video frames received at the client computer until a first encoded pixel is detected in a first image frame. The encoded pixel indicates that the server computer received the action request. Further, the method polls video frames received at the client computer until a second encoded pixel is detected in a second image frame indicating the completion of the action associated with the action request. The action performance time is stored in memory after calculating the time difference between the arrivals of the first and second image frames.

In yet another embodiment, a system measures the performance of virtual desktop services. The system includes a server computer and a performance server. The server computer is configured to process an action request received from a client computer. The server computer includes a server agent that receives the action request, and a workload module in communication with the server agent. The workload module is configured to embed a first encoded pixel into a first image frame that is communicated to the client computer when acknowledging receipt of the action request, to process an action associated with the action request, and to embed a second encoded pixel into a second image frame that is communicated to the client computer after completion of the action. The performance server receives an action performance time from the client computer and stores in memory the action performance time. The action performance time is the time difference between the arrivals of the first and second image frames at the client computer.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Embodiments of the invention include methods, systems, and computer programs for measuring performance of virtual desktop services offered by a server computer. The method includes receiving from a client computer an action request to be executed at the server computer, where the server computer is configured to generate display views for the requesting client. The method further embeds, at the server computer, a first encoded pixel into a first image frame that is communicated to the client computer when acknowledging receipt of the action request. Further, the method embeds a second encoded pixel into a second image frame that is communicated to the client computer after completion of the action associated with the action request. Action performance time, also referred to herein as the server latency, is stored in memory, where the action performance time is the time between arrivals of the first and second image frames at the client computer. The stored timing information is used to generate statistical performance data.

It will be obvious, however, to one skilled in the art, that the present invention may be practiced without some or all of these specific details. In other instances, well known process operations have not been described in detail in order not to unnecessarily obscure the present invention.

Figure 1:
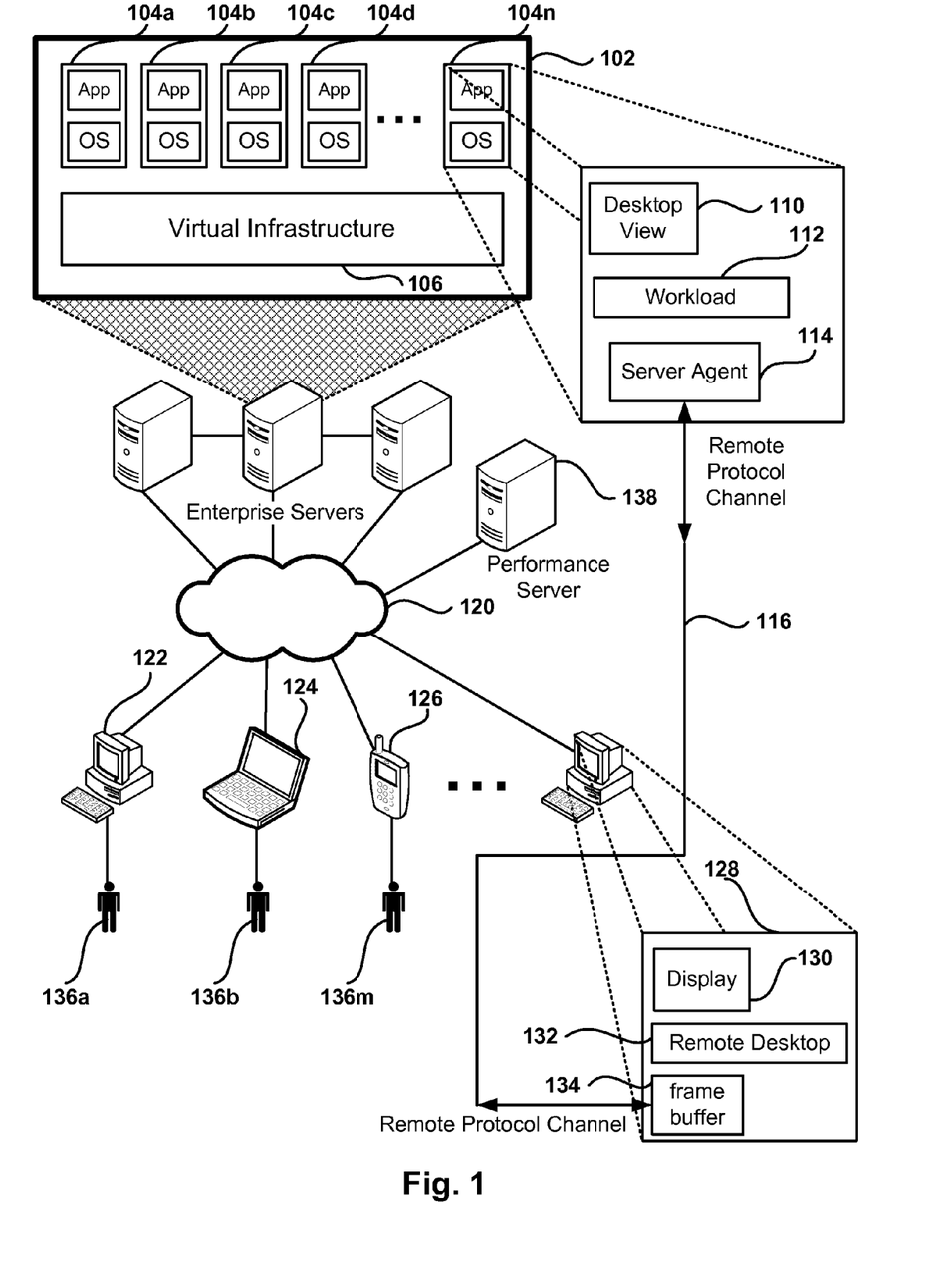
FIG. 1 depicts a remote desktop environment including virtual machine servers, according to one embodiment.

FIG. 1 depicts a remote desktop environment including virtual machine servers, also referred to as enterprise servers, according to one embodiment. The environment depicted in FIG. 1 includes enterprise servers 102 that provide virtual desktop services to remote users 136a-m. Although embodiments of the present invention are described within a virtual desktop system, the embodiments presented can be used in other environments with a remote display application transmitting display data to a remote client.

In one embodiment, performance server 138 is also part of virtualization server 102. Performance server 138 collects performance data from servers and clients and analyzes the data collected for presentation to a user. A simplified architecture of virtualization server 102 is shown in FIG. 1, with some components omitted for simplification purposes. Virtual infrastructure layer 106 manages the assignment of virtual machines (VM) 104a-n in enterprise server 102 to remote users. Remote users 136a-m are connected to computers 122, 124 and 126 acting as clients in the virtual infrastructure. Computers 122, 124 and 126 provide display presentation and input/output capabilities associated with virtual machines 104a-n. Clients include PC 122, laptop 124, PDA, mobile phone 126, etc. Clients communicate with virtualization server 102 via network 120.

Virtual machines 104a-n include a Guest Operating System (GOS) supporting applications running on the guest OS. A different view of virtual machine 104n includes desktop view 110, workload module 112, and server agent 114. Server Agent 114 is a process executing in the VM that processes action requests from local client 128 and provides action start and completion times. On the other end, a local client 128 includes display 130, remote desktop client 132 and frame buffer 134. Desktop view 110 corresponds to the display for the virtual machine, which is transmitted to display 130 at local client 128. The display information is received by frame buffer 134 and remote desktop 132 updates display 130.

A frame buffer is a video output device that drives a video display from a memory buffer containing a complete frame of data. The information in the buffer typically consists of color values for every pixel on the screen. Color values are commonly stored in 1-bit monochrome, 4-bit palettized, 8-bit palettized, 16-bit highcolor and 24-bit truecolor formats. Virtual Machine 104n communicates with the associated local client over network 120 using a remote protocol, such as Remote Desktop Protocol (RDP). Remote Desktop Protocol is a multichannel capable protocol that supports separate virtual channels for carrying presentation data, serial device communication, licensing information, highly encrypted data (keyboard, mouse activity), etc.

In one embodiment of a remote computing environment, messaging takes place via the data channel, such as the data channel in RDP, and via the display channel used for screen updates, usually in the form of a new rectangle updates for the display. Events on the two channels corresponding to the same operation are not always synchronous. The moment the display channel completes its update is the moment that the user views and perceives that the task previously requested has completed. Measuring display updates is then crucial to rate user experience when operating in a remote environment. It should be noted that display updates arrive almost always later than the data channel updates for the same operation.

Embodiments of the invention measure the performance of the virtual environment as seen by users 136a-m. Control messages are encoded in the display channel (in-band messages) instead of using other out-of-band channels. In many cases, the display channel is the only channel that reaches the client machines because of firewalls and other obstacles between servers and clients. Additionally, the embodiments presented are independent of the communications protocols used to transfer display data, thus being able to reliably obtained performance measurements under different topologies and protocols and assess how different factors affect virtual desktop performance. Further still, the methods presented can scale to tens of thousands of clients and servers without unduly burdening the virtual infrastructure.

Figure 2:
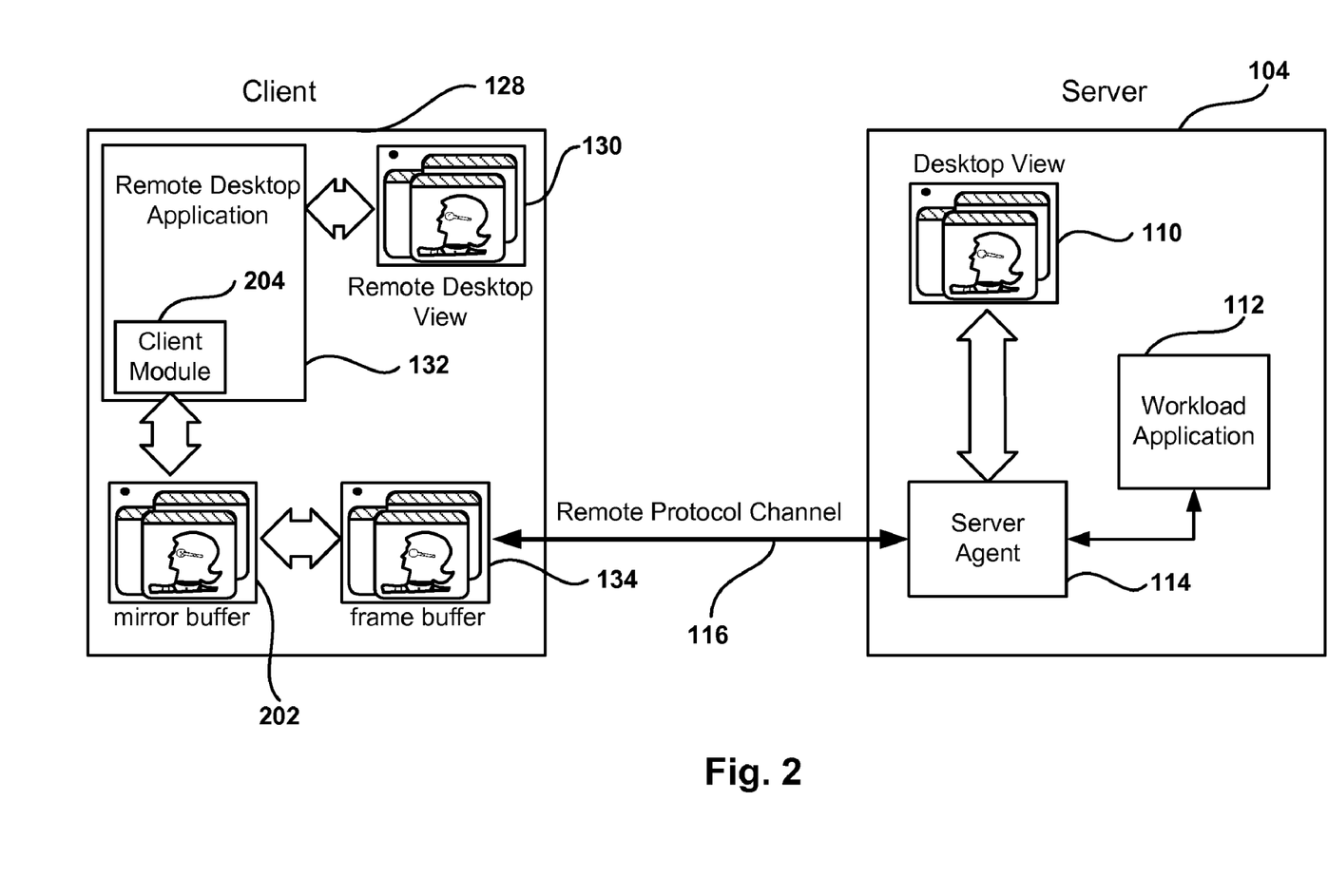
FIG. 2 shows an architecture for measuring display performance using information sent on the display channel and detected on a mirror buffer, in accordance with one embodiment.

FIG. 2 shows an architecture for measuring display performance using information sent on the display channel and detected on a mirror buffer, in accordance with one embodiment. Rather than using the data channel, server 104 notifies client 128 of particular events using a specific section of the screen. A specific area of the screen is designated to carry information in the form of encoded pixels that correspond to predefined messages. For example, the area can be a pixel, a square, a rectangle, a line, a circle, etc. as described in more detail below with reference to FIGS. 3A-D.

Initially, a user action, such as a mouse click, is detected at remote desktop application 132. The action is sent to server agent 114 via client module 204 and then forwarded to workload application 112. Workload application 112 processes the action received and sends the action to the appropriate module in the virtual machine that will process the action. Once the response to the action is complete, workload application 112 notifies server agent 114 and embeds the encoded pixel in the display view. Frame buffer 134 receives the updated display via remote protocol channel 116, and client module 204 scans for and detects the encoded pixel when the action requested as been completed.

Mirror buffer 202 holds a copy in memory of frame buffer to lower the amount of processing required by client 134 module 204 to scan for encoded pixels. Display mirroring technology is widely employed by remote desktop applications such as: NetMeeting, PC Anywhere, VNC, Webex, etc. Mirroring performs better than primitive screen grabbing, because mirroring allows the capture of only the minimally updated regions of the display and retrieves data directly, bypassing the intermediate copy. One example of a mirror buffer commercially available is DFMirage, a video driver mirroring technology for the Windows NT OS family. DFMirage is a driver for a virtual video device managed at the Display Driver Management Layer (DDML) level of the graphics system that exactly mirrors the drawing operations of one or more physical display devices. In another embodiment, client module 204 inspects frame buffer 134 directly without using a mirror buffer.

Table 1 below shows a list of defined actions used in one embodiment to measure remote desktop performance. The list is meant to be exemplary and other combination of actions can be identified for performance monitoring. In another embodiment, other actions beyond those related to specific applications can be monitored, such as a mouse pointer moving over a button or a window, a keyboard input, a mouse click, etc.

TABLE 1

| Application | Operations |
| --- | --- |
| Word | Open, Modify, Save, Close, Minimize, Maximize |
| Excel | Open, Sort, Save, Close, Minimize, Maximize |
| PowerPoint | Open, Slideshow, Modify slide, Append slide, Save, Close, Maximize, Minimize |
| Internet Explorer | Open, Browse, Close |
| Firefox | Open, Close |
| Adobe Acrobat | Open, Browse, Close, Minimize, Maximize |
| WinZip | Install, Uninstall |
| Pkzip | Compress |
| Outlook | Open, Send, Receive, Close, Compose, Reply, Minimize, Maximize |

In one embodiment, measuring response times in a client server remote display environment is performed by having the server notify the client of the start and stop of a particular task via messages over the data channel. The server also communicates a corresponding update through the display channel. Client module 204 polls a predefined co-ordinate on the screen for a display update notification. The method enables the simulation and automation of a real user experience when operating in a remote setup. It should be noted, that using the data channel in addition to the display channel is an optimization to prevent excessive polling on the client side, especially when the mirror driver does not implement callback functionality. In another embodiment, communications on the data channel are omitted, as seen below with respect to FIG. 5.

In one embodiment, server agent 114 ensures that an encoded pixel is not sent unintentionally by monitoring display updates and making sure that the display data does not include an encoded pixel as part of a regular video update. In another embodiment, a different constant encoded pixel is sent in the display frames between the start and stop display frames. For example, the start pixel can be a red pixel, the stop pixel can be a green pixel, and a white pixel is included in all the display frames between the red and green pixels.

In another embodiment, the encoded pixels are included in more than one frame to add redundancy and diminish the number of inaccurate measurements due to missed updates. In yet another embodiment, an encoded pixel is embedded in the start frame and all the following frames until the action requested completes.

Figure 3A:
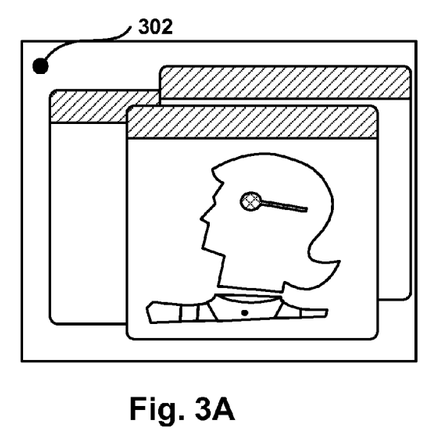
FIGS. 3A-D describe different methods for sending encoded information on the display channel, according to different embodiments.

FIGS. 3A-D describe different methods for sending encoded information on the display channel, according to different embodiments. In FIG. 3A, pixel 302 is used to include encoded messages. Each message is encoded with a different pixel value. For example, a teal pixel (0xff00ff) is used for an operation start message and a red pixel (0xFF0000) for an operation complete message. In another embodiment, the same encoded pixel value is used for the start and complete messages, thus the polling at the client scans only for a specific value. For example, if a value of 0x0 (black) is used for the encoded pixel, the scanning needs only to check for a pixel value equal to zero, resulting in less computing cycles and reduced scanning overhead.

Figure 3B:
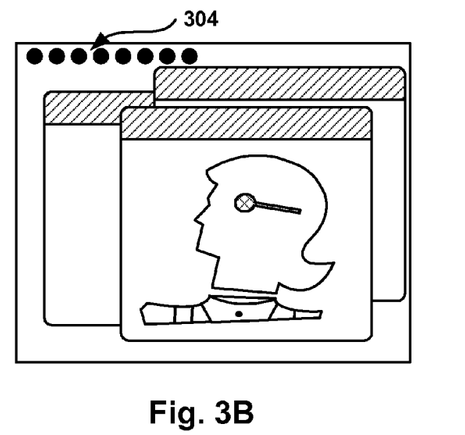

In the embodiment shown in FIG. 3B, several encoded pixels are used to communicate information to the client. The additional pixels can be used for redundancy purposes to facilitate detection of false positives or to detect a corrupted encoded pixel. The additional pixels can also be used to communicate extra information. For example, the second pixel can be encoded to indicate the application associated with the request (i.e. Microsoft PowerPoint), or to encode a frame number, a timestamp associated with the video frame, the server identification, the running core identification, etc.

In one embodiment, the information is encoded using one byte per bit of information, by assigning a 0 value to one particular byte value and a 1 value to a different byte value. Encoding each bit into a byte of data solves the problem associated with some remote communication protocols that can lose some of the video information in order to improve overall performance by delivering video that is almost the same as the original, but requiring a lower amount of transmitted data.

In other embodiment, one bit of information is encoded over multiple pixels or several bytes of pixel data, such as two, three or more, which can be helpful when pixel data suffers lossy compression during transmittal. In yet another embodiment, a bit of information is encoded in a sub-pixel of pixel data. A sub-pixel is an intensity value for a color component of one pixel. Typically, the sub-pixel defines intensity information for a red, green, or blue component of the pixel. For 24-bit "Truecolor," where each sub-pixel is encoded as one byte (8 bits) of pixel data, then each bit is encoded in one byte. But, if the sub-pixel requires a different amount of storage, then each bit would be encoded using the amount of storage required for the sub-pixel. For example, in 16 bit "Highcolor," the red and blue sub-pixels are encoded with 5 bits of data each, whereas the green sub-pixel is encoded with 6 bits.

Some video and image compression algorithms rely on a technique known as chroma subsampling, wherein chroma, or color information, is sampled at a lower resolution than the luma, or brightness information. In this case, using sub-pixel information might be unreliable for individual pixel data. Where chroma subsampling is used, each bit of information may be encoded using an overall intensity of the pixel, rather than discriminating on the basis of sub-pixel information. In this case, white and black pixels may be used so that each pixel correlates to one bit of information. Various techniques can be implemented to obtain an accurate overall intensity value. For example, since the green color component carries most intensity information, the green color component for each pixel can be used alone to identify the bit value.

Several bits can be combined together to form a word, such as a frame number. In one embodiment, RBG encoding is used where each pixel is encoded as three bytes, and each byte is used to encode one bit of information, resulting in 3 bits of encoded information per pixel. Each byte is encoded as 0x00 or 0xff. If the frame number is encoded as a 24-bit value, then 8 pixels are used to encode the frame number.

It should be noted that for description purposes, some embodiments described herein refer to one encoded pixel. The person skilled in the art will readily appreciate that where one encoded pixel is described, embodiments described herein can be expanded to cover information encoded within a group of pixels. The group of pixels can be used to record more bits of information, add redundancy to the information encoded, encode bits using more than one byte, etc.

Figure 3C:
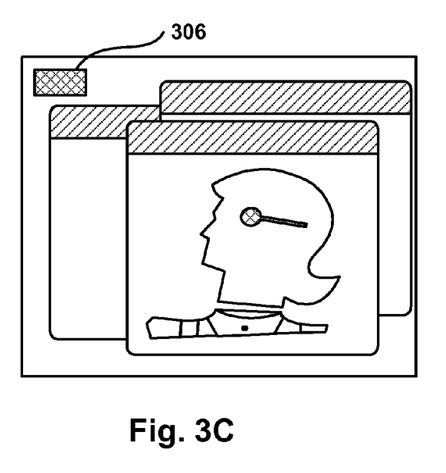

FIG. 3C shows a group of encoded pixels inside a rectangle of a video frame. In one embodiment, the rectangle corresponds to the top left corner of the video frame, but other configurations are also possible. In another embodiment, several rectangular areas can be used simultaneously, which include unique information in each rectangle or include redundant information to improve reliability.

Figure 3D:
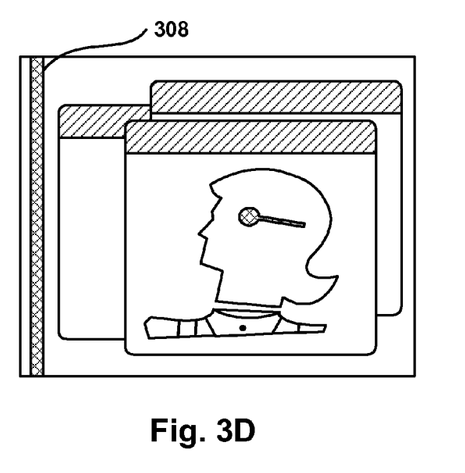

FIG. 3D shows a configuration of encoded pixels in line 308 of the video screen. The line can be horizontal, vertical, or in any other direction. The line can also be a complete horizontal or vertical line within the video display, or can be just a segment of a line (which would be similar to rectangle 306 of FIG. 3C with a width of one pixel). In one embodiment, the line can be several pixels wide.

A large encoded pixel area, such as line 308, is useful for monitoring purposes during testing as the encoded pixels can easily be observed by visual inspection. In yet another embodiment, the whole video frame is given an encoded pixel value, such as a red pixel, that results in a flashing video display when encoded messages are received at the client.

It should be appreciated that the embodiments illustrated in FIGS. 3A-D are exemplary arrangements of encoded pixels within a video frame. Other embodiments may utilize different arrangements or different pixel values. The embodiments illustrated in FIGS. 3A-D should therefore not be interpreted to be exclusive or limiting, but rather exemplary or illustrative.

Figure 4:
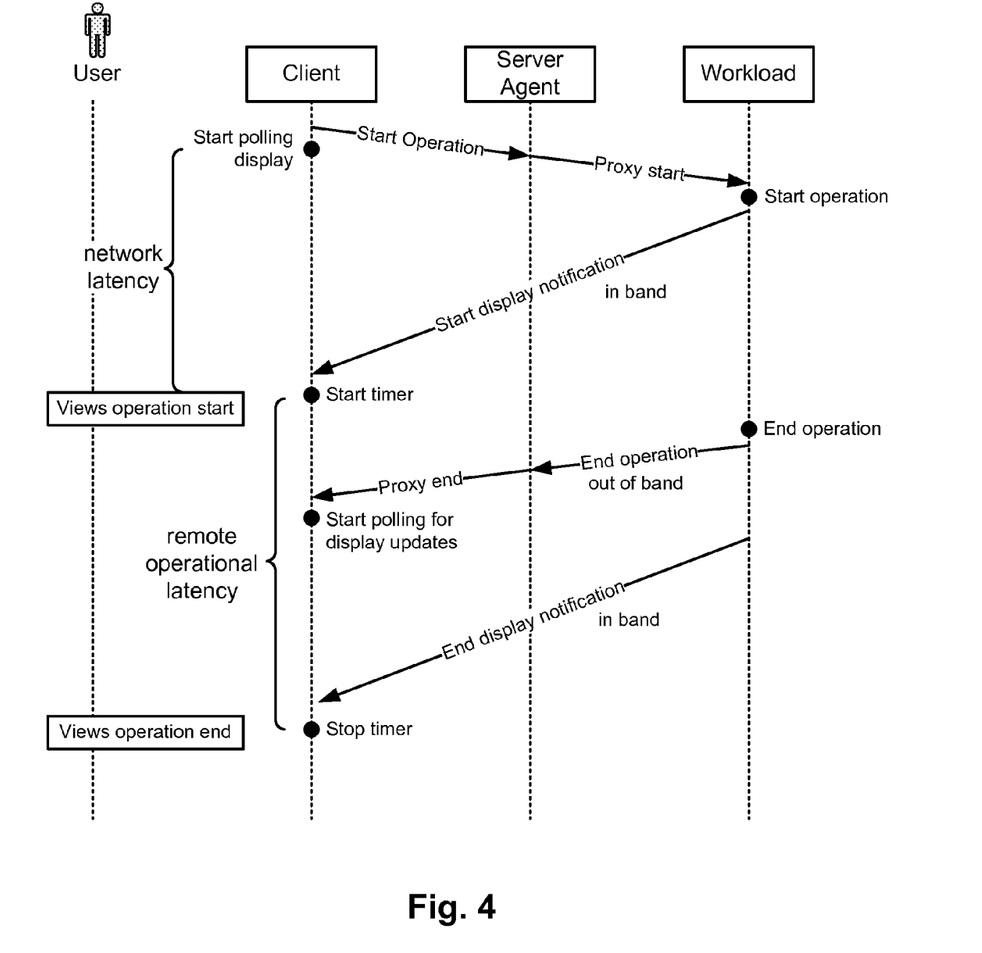
FIG. 4 shows a timing diagram for measuring response time at the server using in-band and out-of band messages, according to one embodiment.

FIG. 4 shows a timing diagram for measuring response time at the server using in-band and out-of band messages, according to one embodiment. In the embodiment shown in FIG. 4, action requests are simulated by the client module in order to increase the number of action requests generated in a testing environment. In another embodiment, the actions are generated by user interaction and the client module detects the action requests that are then sent to the server. It should be noted, that timing information is exemplary and the timing descriptions are aimed at facilitating understanding of events and not actually drawn to scale. Actual timing may vary from the timing information shown in FIG. 4.

The client module sends a start operation request, e.g., in the form of an action, such as a mouse-click event, to the server agent that forwards the request in the form of a proxy start message to the workload module. The client module starts polling the display after sending the start operation message to detect a "start display notification" message from the server. The workload module passes the request to the appropriate application at the server and then sends the "start display notification" to the client. The "start display notification" is sent in the display channel, also referred to as the in-band channel.

Once the client polling detects the "start display notification", a timer is started to measure the time used by the server to complete the action requested. The user sees the operation start in the display once the start display notification is received.

Once the operation ends at the server, the workload module sends an "end operation" message via the data channel, herein referred to as the out-of-band channel. When the "end operation" message is received by the client, the client starts polling for display updates to detect the end of the operation in the display. After sending the out-of-band message, the workload module sends an in-band "end display notification" message in a display frame.

When the "end display notification" is received at the client, the polling detects the encoded information in the display channel and stops the timer in order to measure the amount of time between receiving the start and end display notifications, denoted as "remote operational latency" in FIG. 4. The user views the operation end in the display at the same time that the "end display notification is received". The remote operational latency measurement is stored in memory and can be sent to central performance server 138 (FIG. 1) that collects performance data for one or more clients.

In another embodiment, the client also measures the amount of time between sending the original start operation and receiving the start display notification to provide additional information on round-trip request processing time, noted as network latency in FIG. 4.

Figure 5:
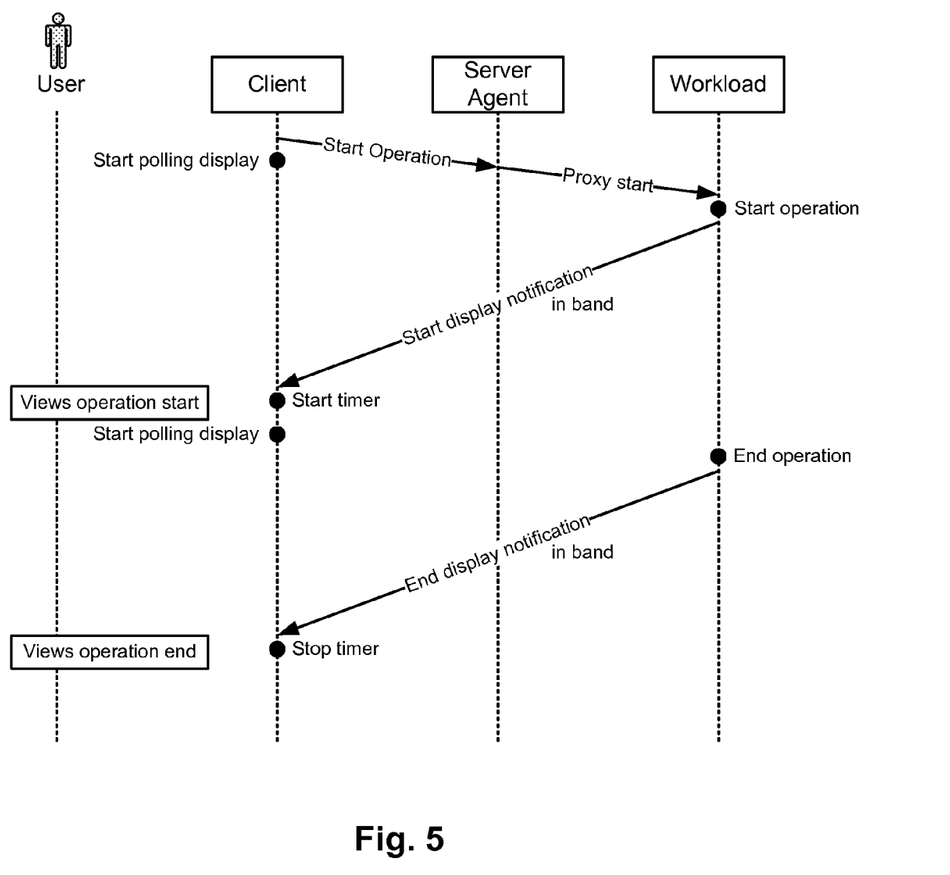
FIG. 5 shows a timing diagram for measuring response time at the server using in-band messages, according to one embodiment

FIG. 5 shows a timing diagram for measuring response time at the server using in-band messages, according to one embodiment. The method of FIG. 5 relies on in-band messages exclusively, that is, no out-of-band messages are sent. The result is that the polling of the display on the client side starts after receiving the start display notification.

Figure 6:
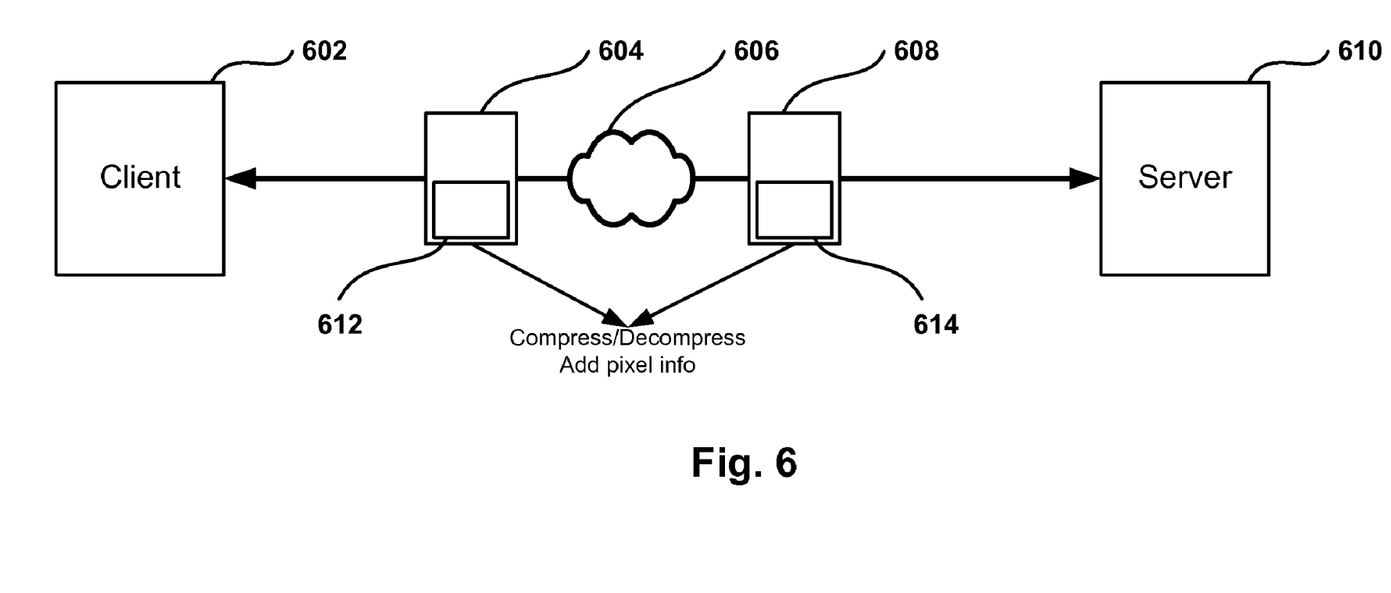
FIG. 6 depicts one embodiment of a network diagram for adding in-route information to the display channel.

FIG. 6 depicts one embodiment of a network diagram for adding in-route information to the display channel. Adding encoded information in the display channel can be expanded by adding encoded pixels at different times and by additional entities involved in the processing of client requests. In FIG. 6, compression modules 604 and 608 perform compression and decompression of data before being sent thorough wide area network (WAN) 606. Encoding modules 612 and 614 inside compression modules 604 and 608 add encoded pixels to the display channel before compressing the video data to provide travel information of the display data. In one embodiment, timestamp and server identification are encoded in the display data by encoding modules 612 and 614.

In another embodiment, additional encoded pixels are added to the display frame by modules inside server 610 to identify processing time by the different modules inside the server.

Figure 7:
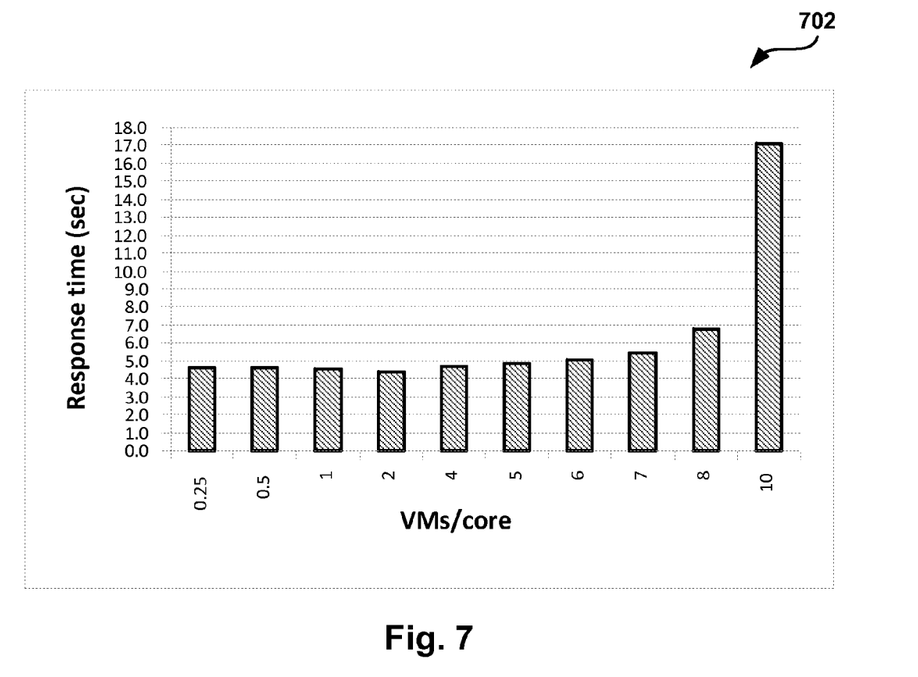
FIG. 7 shows a graphical representation of performance data for an action type, Microsoft® Office Word modify, and different configurations of Virtual Machines (VMs) per core, according to one embodiment.

FIG. 7 shows a graphical representation of performance data for an action type, Microsoft® Office Word modify, and different configurations of VMs per core, according to one embodiment. Once performance information is recorded in memory, the performance information can be processed to present aggregated statistical information. In one embodiment, the performance information is sent to a performance server, such as performance server 138 of FIG. 1, to produce statistical data from a plurality of clients. FIG. 7 presents statistical data for remote desktop services in a virtual infrastructure environment along two dimensions for the Microsoft Office Word modify action. The first dimension is related to the number of virtual machines (VMs) per processing core at the server. The second dimension corresponds to the response time. In the embodiment shown in FIG. 7, the response time stays substantially constant until the number of VMs per core reaches 7. At 8 VMs per core the performance degrades slightly, and at 10 VMs per core, the performance degrades substantially going from a delay of about 7 seconds to a delay of 17 seconds.

The performance results are used to fine tune the virtual desktop environment by identifying performance bottlenecks and acting upon them. For example, the virtual infrastructure may transfer a client from one server to another to improve response time and load balancing.

Figure 8:
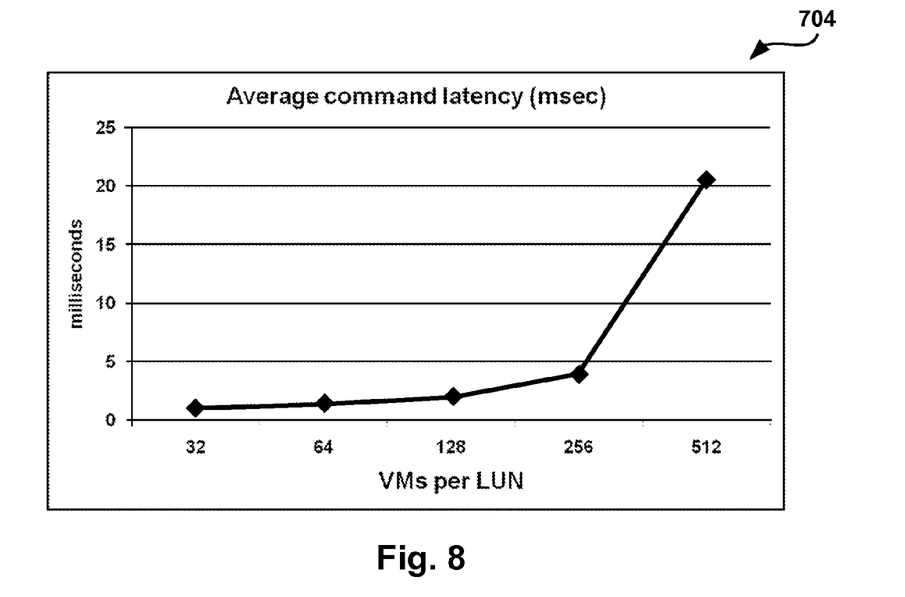
FIG. 8 shows a graphical representation of latency as a function of the number of VMs per Logical Unit Number (LUN), according to one embodiment.

FIG. 8 shows a graphical representation of latency as a function of the number of VMs per Logical Unit Number (LUN), according to one embodiment. In the environment captured by the performance data in FIG. 8, the response time deteriorates rapidly once the number of VMs per LUN goes beyond 256. The Network Manager can use this information to identify an appropriate limit of the number of VMs per LUN, e.g., by transferring VMs to a different LUN, or by adding additional LUNs to the computing environment.

Figure 9:
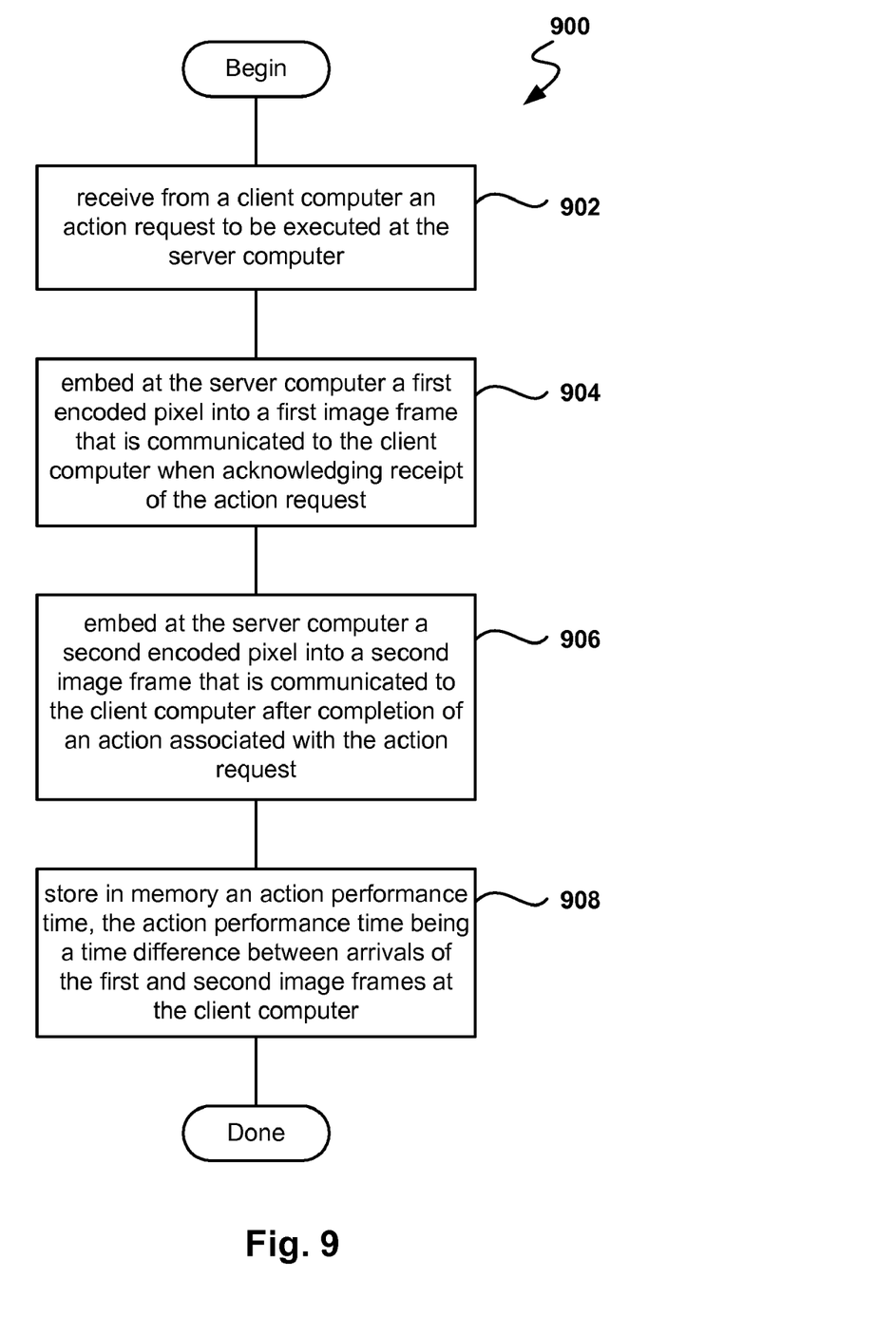
FIG. 9 shows the process flow for measuring performance of virtual desktop services offered by a server computer.

FIG. 9 shows the process flow for measuring performance of virtual desktop services offered by a server computer. In operation 902, the method receives from a client computer an action request to be executed at a server computer. See for example Table 1 previously presented including a list of possible actions. A first encoded pixel is embedded at the server computer in operation 904. The first encoded pixel is embedded into a first image frame that is communicated to the client computer when acknowledging receipt of the action request. See FIGS. 3A-D for exemplary embodiments to embed an encoded pixel.

In operation 906, a second encoded pixel is embedded at the server computer into the display channel. The second encoded pixel is added to a second image frame that is communicated to the client computer after the completion of the action associated with the action request. In operation 908, the method stores in memory an action performance time. The action performance time is the time difference between the arrivals of the first and second image frames at the client computer. See the description of FIGS. 4 and 5 above for details on how to obtain timing information.

Figure 10:
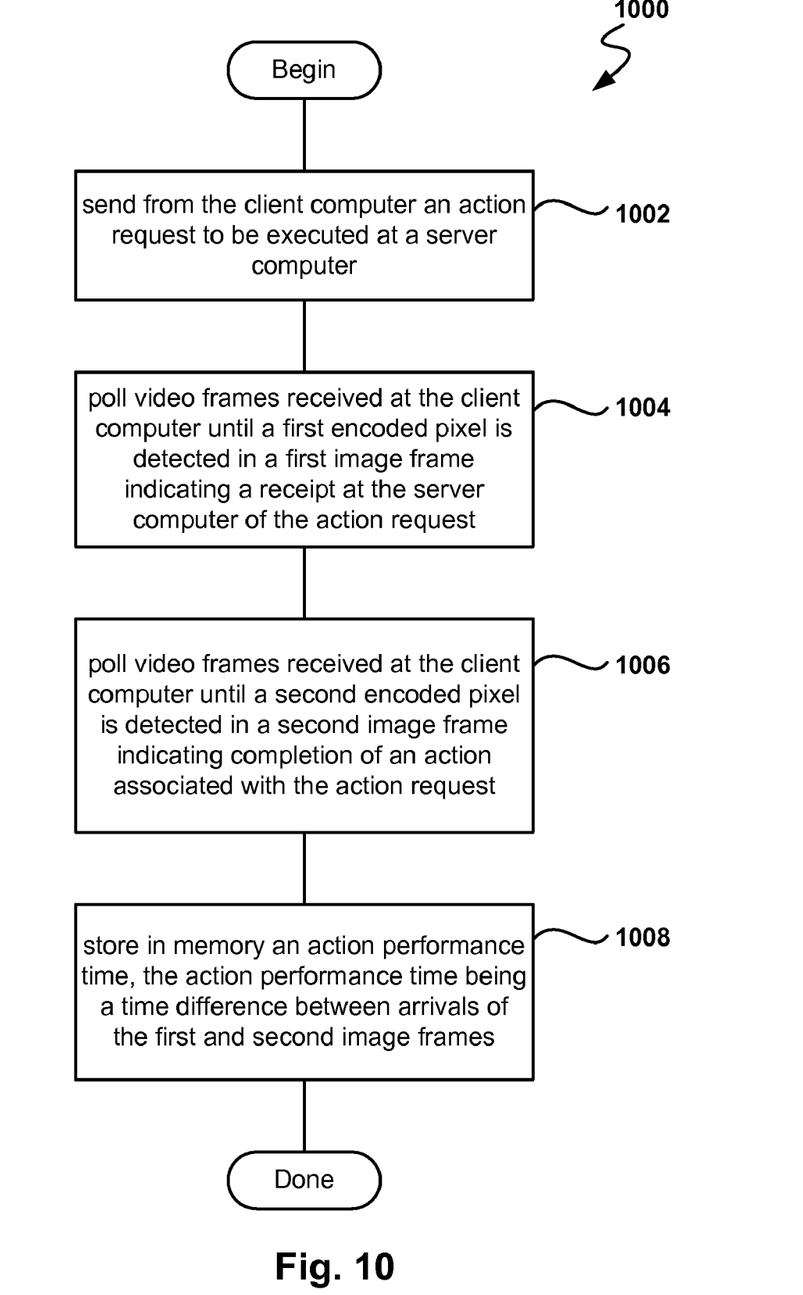
FIG. 10 shows the process flow for measuring performance of a virtual desktop application at a client computer.

FIG. 10 shows the process flow for measuring performance of a virtual desktop application at a client computer. In operation 1002, the method sends from the client computer an action request to be executed at a server computer. See for example, clients 136*a-m* and enterprise server 102 in FIG. 1. The client computer polls received video frames in operation 104 until a first encoded pixel is detected in a first image frame. The first encoded pixel indicates the receipt at the server computer of the action request. The client computer further polls video frames received in operation 1006 until a second encoded pixel is detected in a second image frame. The second encoded pixel indicates the completion of an action associated with the action request. In operation 1008, the method stores in memory an action performance time, the action performance time being a time difference between arrivals of the first and second image frames. The performance information can be processed to produce statistical data used by network administrators. See for example FIGS. 7 and 8 for graphical representations of collected performance data.

Figure 11:
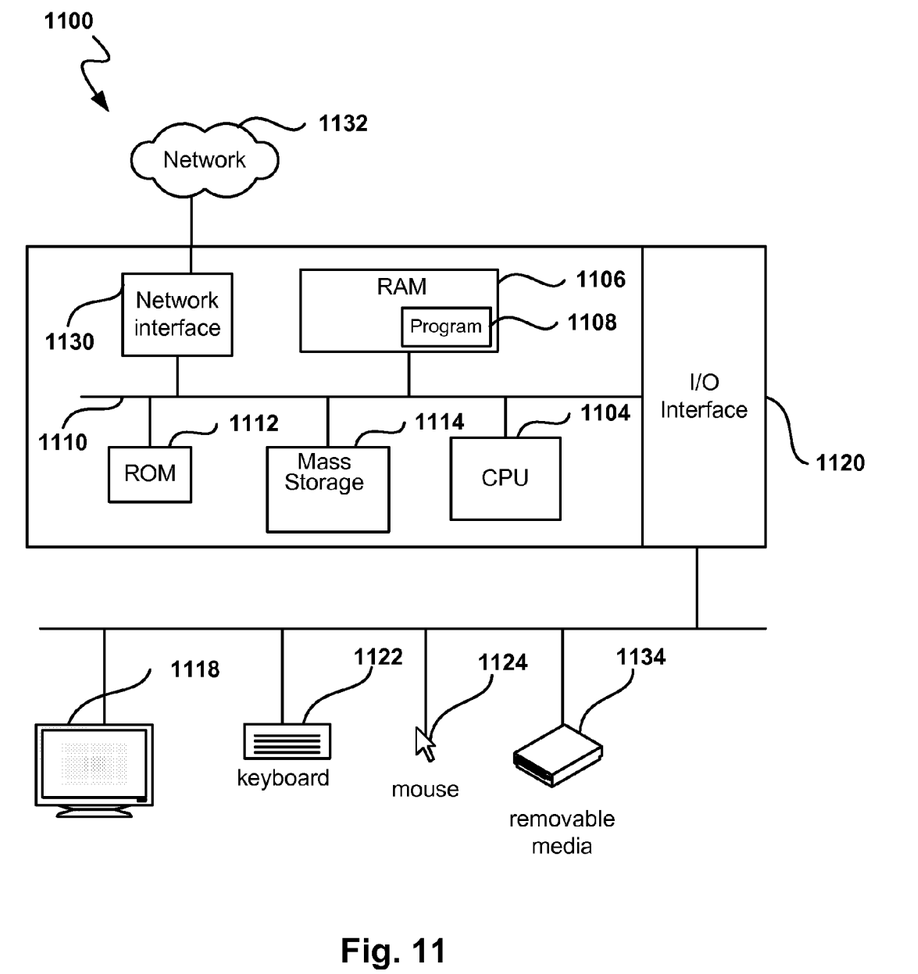
FIG. 11 is a simplified schematic diagram of a computer system for implementing embodiments of the present invention.

FIG. 11 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1104, which is coupled through bus 1110 to random access memory (RAM) 1106, read-only memory (ROM) 1112, and mass storage device 1114. Program 1108 resides in random access memory (RAM) 1106, but can also reside in mass storage 1114. Program 1108 can include a performance manager program, client module 204 from FIG. 2, server agent 114, workload application 112, etc.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein, such as remote desktop view 130 from FIG. 2. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Although virtualization operations can take on many forms, several concepts are important to ensure that physical constructs of physical machines are properly transferred to virtual machines. With this in mind, and by way of reference, more information on virtual system and methods can be found in U.S. patents owned by the assignee of the present application, VMware, Inc. Thus, U.S. Pat. Nos. 6,397,242, 6,496,847, 7,069,413, 7,356,679, and US Published Application 2008/0244028 A1, are each incorporated by reference for all purposes.

For completeness, reference is made to an example server system, that is referred to by the trademark "ESX™", which is provided by VMware, of Palo Alto, Calif. However, the methods, systems and embodiments are not limited to any one brand of server or virtualization servers. The example ESX(x) server is a hypervisor that partitions physical servers in multiple virtual machines. Each virtual machine may represent a complete system, with processors, memory, networking, storage and BIOS. VMware ESX enables multiple virtual machines to: (a) share physical resources, (b) run unmodified operating systems and applications, and (c) run the most resource-intensive applications side by side on the same server. Other servers made by other suppliers can have similar functionality or more or less functionality, depending on their target product. Accordingly, the systems, methods and computer readable media can be practiced using any product, software, or hardware configuration.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for measuring performance of virtual desktop services offered by a server computer, the method comprising:
   receiving from a client computer an action request to be executed at the server computer;
   embedding at the server computer a first encoded pixel into a first image frame that is communicated to the client computer when acknowledging receipt of the action request;
   embedding at the server computer a second encoded pixel into a second image frame that is communicated to the client computer after completion of an action associated with the action request; and
   storing in memory an action performance time, the action performance time being a time difference between arrivals of the first and second image frames at the client computer.

2. The method as recited in claim 1, further including, sending an out of band message from the server computer to the client computer before communicating the second image frame, the out of band message being sent on a channel different from a channel transmitting the image frames.

3. The method as recited in claim 1, wherein values for the first encoded pixel and the second pixel differ in at least one of color or intensity, the first encoded pixel and the second encoded pixel having a same location in their corresponding image frames.

4. The method as recited in claim 1, further including, embedding a plurality of encoded pixels in the first image frame, the plurality of encoded pixels forming one of a square, a rectangle, a line, or a segment.

5. The method as recited in claim 1, further including, embedding a third constant pixel into all image frames communicated between the first and the second image frames.

6. The method as recited in claim 1, further including, embedding the first encoded pixel in n consecutive frames following the first image frame, wherein the client computer samples one out of every k incoming frames to detect the first encoded pixel, k being equal to or smaller than n plus 1.

7. The method as recited in claim 1, further including, embedding additional encoded pixels into the first image frame before the first image frame is communicated to the client computer, the additional encoded pixels being embedded at different stages of processing within the server computer.

8. The method as recited in claim 1, further including, storing in memory action performance times from a plurality of clients requesting actions from the server computer.

9. The method as recited in claim 8, further including, generating statistical performance metrics based on the stored action performance times.

10. The method as recited in claim 1, wherein pixel information is encoded in binary RGB values.

11. A method for measuring performance of a virtual desktop application at a client computer, the method comprising:
    sending from the client computer an action request to be executed at a server computer;
    polling video frames received at the client computer until a first encoded pixel is detected in a first image frame indicating a receipt at the server computer of the action request;
    polling video frames received at the client computer until a second encoded pixel is detected in a second image frame indicating completion of an action associated with the action request; and
    storing in memory an action performance time, the action performance time being a time difference between arrivals of the first and second image frames.

12. The method as recited in claim 11, wherein the client computer includes a mirror buffer that mirrors a framebuffer that holds received image frames, wherein polling video frames further includes polling the mirror buffer.

13. The method as recited in claim 11, wherein the client computer includes a framebuffer that holds received image frames, wherein polling video frames further includes polling the framebuffer.

14. The method as recited in claim 11, wherein the action request is originated by a client module at the client computer, the client module being configured to simulate user requests.

15. The method as recited in claim 11, wherein the action request is selected from a group consisting of run application, open file, open website, modify file, save file, close file, minimize window, maximize window, install, uninstall, compress, uncompress, send, or receive.

16. The method as recited in claim 11, furthering including, receiving an out of band message from the server computer, the out of band message being sent on a channel different from a channel transmitting the image frames, wherein the polling video frames received at the client computer until a second encoded pixel is detected begins after receiving the out of band message.

17. A system for measuring performance of virtual desktop services, the system comprising:
   a server computer configured to process an action request received from a client computer, the server computer including,
      a server agent that receives the action request, and
      a workload module in communication with the server agent, the workload module configured to,
         embed a first encoded pixel into a first image frame that is communicated to the client computer when acknowledging receipt of the action request,
         process an action associated with the action request,
         embed a second encoded pixel into a second image frame that is communicated to the client computer after completion of the action; and
   a performance server that receives an action performance time from the client computer and stores in memory the action performance time, the action performance time being a time difference between arrivals of the first and second image frames at the client computer.

18. The system as recited in claim 17, wherein the performance server receives action performance time information from a plurality of clients, the performance server creating statistical performance data based on the performance time information received from the plurality of clients.

19. The system as recited in claim 18, wherein the performance server shows the created statistical performance data on a display.

20. The system as recited in claim 17, wherein the server computer implements a virtual machine, the client computer implementing a remote desktop application associated with the virtual machine implemented at the server computer.

21. The system as recited in claim 17, further including,
   an intermediate server configured to,
      receive the first image frame communicated by the workload module,
      embed a third encoded pixel in the first image frame, and
      forward the first image frame to the client computer,
   wherein the third encoded pixel is configured to provide travel information related to the first image frame.

* * * * *